(12) United States Patent
Takayanagi

(10) Patent No.: US 10,252,642 B2
(45) Date of Patent: Apr. 9, 2019

(54) INPUT DEVICE HAVING AN OPERATION KNOB

(71) Applicant: ALPS ELECTRIC CO., LTD., Ota-ku, Tokyo (JP)

(72) Inventor: Yoshiteru Takayanagi, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 15/730,809

(22) Filed: Oct. 12, 2017

(65) Prior Publication Data

US 2018/0105068 A1 Apr. 19, 2018

(51) Int. Cl.
| | |
|---|---|
| *H01H 15/00* | (2006.01) |
| *B60N 2/02* | (2006.01) |
| *H01H 19/00* | (2006.01) |
| *H01H 19/04* | (2006.01) |
| *H01H 19/14* | (2006.01) |
| *H01H 25/00* | (2006.01) |

(52) U.S. Cl.
CPC ............ *B60N 2/0228* (2013.01); *H01H 15/00* (2013.01); *H01H 19/00* (2013.01); *H01H 19/04* (2013.01); *H01H 19/14* (2013.01); *H01H 25/008* (2013.01); *H01H 2221/044* (2013.01); *H01H 2235/00* (2013.01); *H01H 2235/024* (2013.01); *H01H 2300/008* (2013.01)

(58) Field of Classification Search
CPC ......... B60N 2/0228; B60N 2/44; H01H 25/04
USPC .................................................. 200/1 R, 330
See application file for complete search history.

(56) References Cited

U.S. PATENT DOCUMENTS 5,455,399 A * 10/1995 Kohno ................. B60N 2/0228
200/330

FOREIGN PATENT DOCUMENTS

| JP | 2004-288393 | * 3/2003 | ............. H01H 25/04 |
| JP | 2004-288393 | 10/2004 | |

* cited by examiner

*Primary Examiner* — Renee S Luebke
*Assistant Examiner* — Iman Malakooti
(74) *Attorney, Agent, or Firm* — Hunton Andrews Kurth LLP

(57) ABSTRACT

An input device has operation shafts whose tips project through a first elongate hole and a second elongate hole formed through an upper plate portion of a case main body and that are movable along the upper plate portion of the case main body. An operation knob is movably attached to the tips of the operation shafts. The case main body is provided with elastic support pieces that deform following the movement of the operation knob and elastically support the operation knob.

7 Claims, 8 Drawing Sheets

INPUT DEVICE HAVING AN OPERATION KNOB

CLAIM OF PRIORITY

This application contains subject matter related to and claims the benefit of Japanese Patent Application No. 2016-205112 filed on Oct. 19, 2016, the entire contents of which is incorporated herein by reference.

BACKGROUND OF THE DISCLOSURE

1. Field of the Disclosure

Embodiments of the present disclosure relate to an input device in which an operation shaft is driven by operating an operation knob, and more specifically, it relates to an input device effectively used in a seat switch used for adjusting the posture of a vehicle seat.

2. Description of the Related Art

Until now, there has been widely known a power seat switch apparatus for a vehicle with which the position of a vehicle seat, the posture of a backrest, and the like can be electrically adjusted.

Examples of power seat switches for a vehicle include that disclosed in Japanese Unexamined Patent Application Publication No. 2004-288393. This power seat switch apparatus for a vehicle is provided with a driving body for selecting the position and posture of a seat, and an operation knob that rocks the driving body. A spherical engaging portion is formed at the tip of the driving body, this engaging portion is held by an engaging holding portion formed in the operation knob, and the operation knob can be smoothly moved relative to the driving body.

In general, a power seat switch apparatus for a vehicle is attached to the side surface of a seat. When operating an operation knob, operation is often performed without looking at the operation knob, while groping for the position of the operation knob.

When an operator gropes for the operation knob and operates it, the operator may strongly grasp part of the operation knob and may apply biasing force to the operation knob. Then, the operation knob may come off from a driving shaft.

In order to prevent the operation knob from coming off, it is conceivable to tightly fit the operation knob on the driving shaft. In that case, a load is applied to the movement of the operation knob, and the operation knob cannot be smoothly moved relative to the driving shaft.

These and other drawbacks exist.

SUMMARY OF THE DISCLOSURE

Embodiments of the present disclosure have been made in view of such circumstances, and provide an input device in which an operation knob can be smoothly moved relative to an operation shaft, and the operation knob can be prevented from coming off from the operation shaft.

According to an example embodiment, an input device includes at least one operation shaft, the tip thereof being projected to the outside through a shaft insertion hole formed through a case main body, the at least one operation shaft being movable along the case main body, and an operation knob movably attached to the tip of the at least one operation shaft and driving the at least one operation shaft. A bearing portion provided inside the operation knob is recess-projection fitted on the at least one operation shaft. The case main body is provided with at least one elastic support piece deforming following the movement of the operation knob and elastically supporting the operation knob.

By virtue of this configuration, the operation knob can be prevented from coming off from the operation shaft when the operation knob is moved.

At least one elastic support piece is provided such that a proximal end portion is integrally attached to the underside of the case main body, a main body portion has a middle part bent such that the main body portion extends downward from the underside of the case main body and then extends upward toward the underside of the case main body, and a distal end portion projects to the outside through a piece insertion hole formed through the case main body and enters the operation knob.

By virtue of this configuration, the amount of deflection of the elastic support pieces can be large, and the feel of operation moving the operation knob can be improved.

A hook portion is formed at the tip of the at least one elastic support piece, an engaging groove portion engaged with the hook portion be formed in the inner wall of the operation knob, the engaging groove portion be engaged with the hook portion, and the operation knob be thereby elastically supported by the at least one elastic support piece.

By virtue of this configuration, since the engaging groove portion is engaged with the hook portion, the operation knob can be reliably prevented from coming off from the operation shaft.

When the operation knob is operated, biasing force acts on the at least one elastic support piece in a direction opposite to the operation direction.

By virtue of this configuration, after the operation knob is moved, the operation knob can be automatically returned to the original position.

The at least one elastic support piece includes a first elastic support piece and a second elastic support piece provided opposite to each other in the case main body.

By virtue of this configuration, when the operation knob is reciprocated, the elastic support pieces can deform following the movement of the operation knob and can elastically support the operation knob.

The at least one operation shaft includes a first operation shaft and a second operation shaft, and the operation knob be supported rotatably about the first operation shaft and linearly movably along the second operation shaft.

By virtue of this configuration, two operation shafts can be driven by rotating or linearly moving one operation knob. Also in this moving operation of the operation knob, the operation knob can be elastically supported on the case main body, and the operation knob can be prevented from coming off from the operation shafts.

The at least one elastic support piece be provided at a position between the first operation shaft and the second operation shaft in the case main body.

By virtue of this configuration, since the elastic support piece is provided at a position where an operation load is applied to the operation knob, the operation knob is stably supported by the elastic support piece, and can be reliably prevented from coming off from the operation shafts.

Embodiments of the present disclosure can provide an input device in which an operation knob can be smoothly moved relative to an operation shaft, and the operation knob can be prevented from coming off from the operation shaft.

DETAILED DESCRIPTION OF THE DISCLOSURE

A seat switch according to an embodiment of the present disclosure will be described below with reference to the drawings. The following description is intended to convey a thorough understanding of the embodiments described by providing a number of specific embodiments and details involving an input device having an operation knob. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
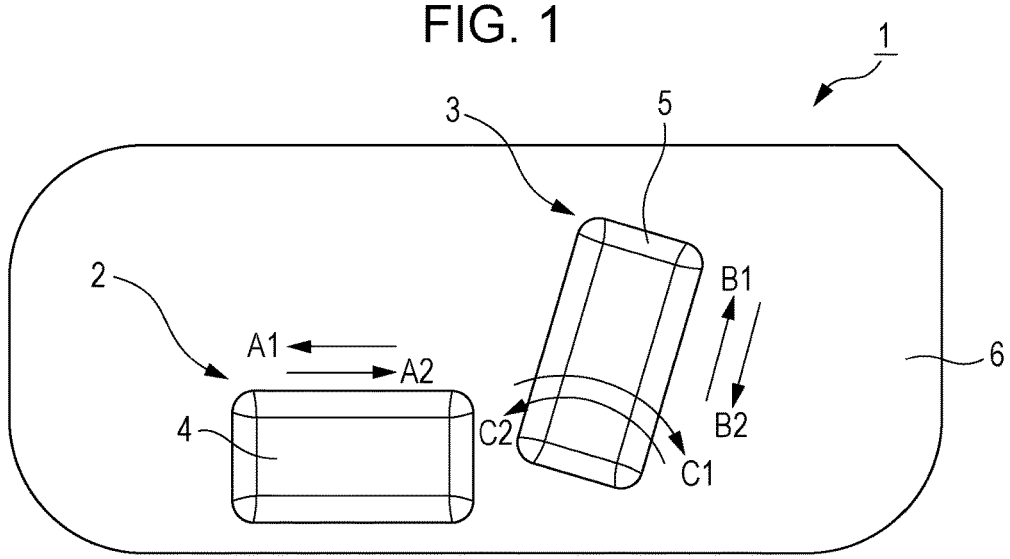
FIG. 1 is a plan view of a seat switch according to an embodiment of the present disclosure.
Figure 2:
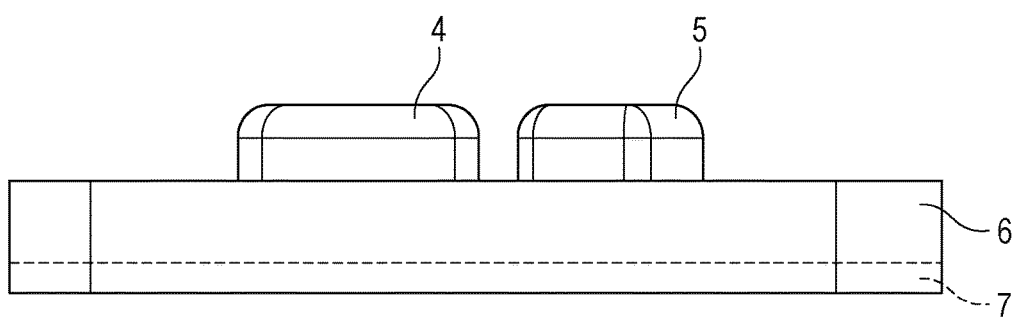
FIG. 2 is a side view of a seat switch according to an embodiment of the disclosure.
Figure 3:
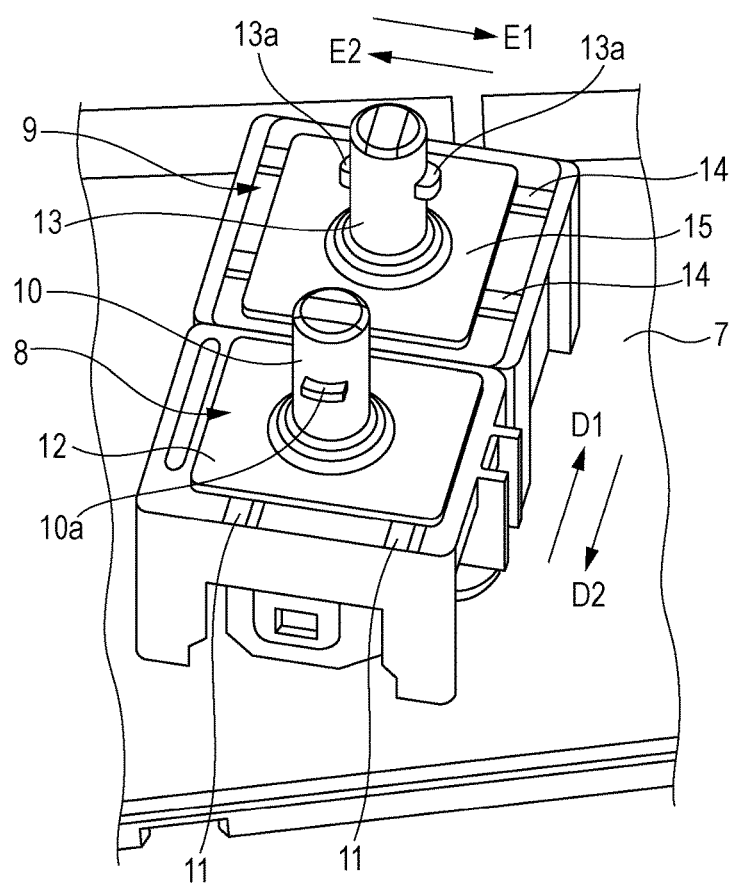
FIG. 3 is an enlarged perspective view showing an attachment part of a switch portion for a backrest according to an embodiment of the disclosure.
Figure 4:
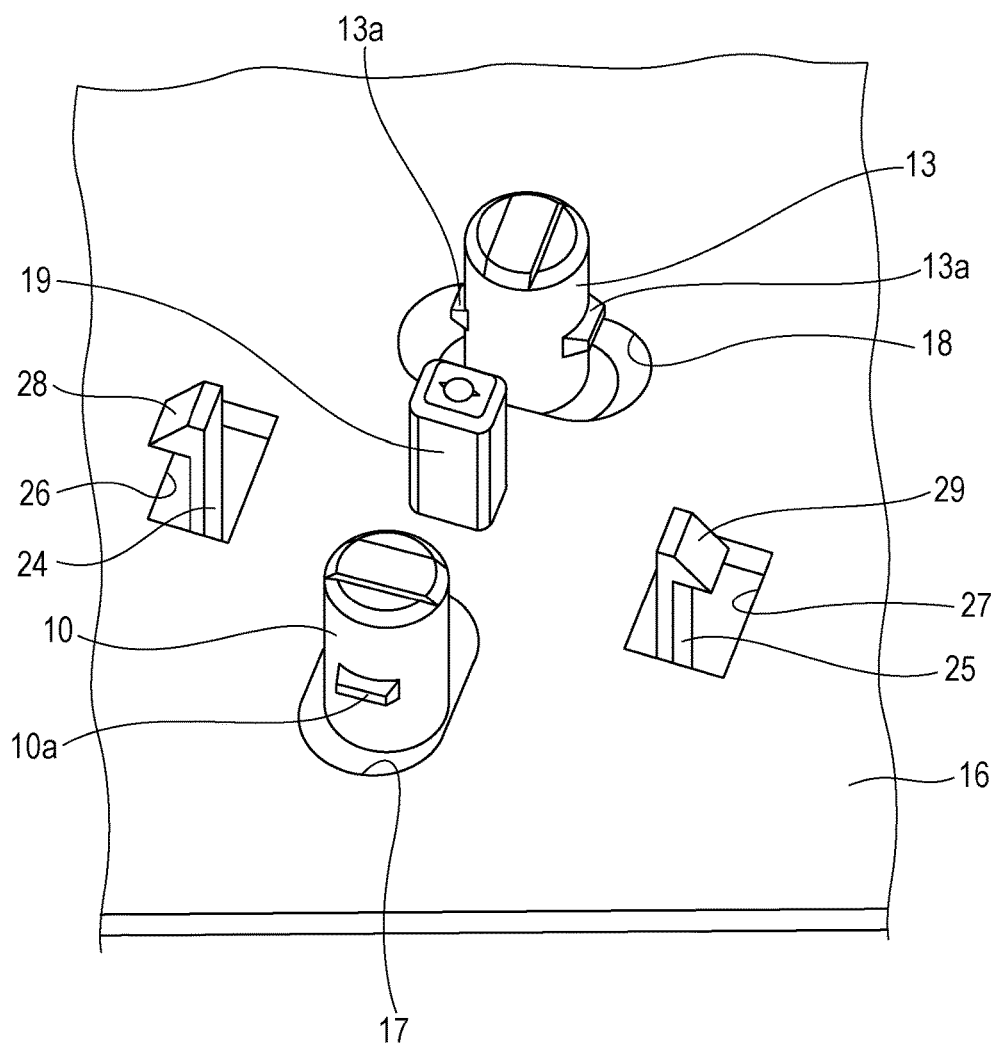
FIG. 4 is an enlarged perspective view showing parts of tips of operation shafts according to an embodiment of the disclosure.
Figure 5:
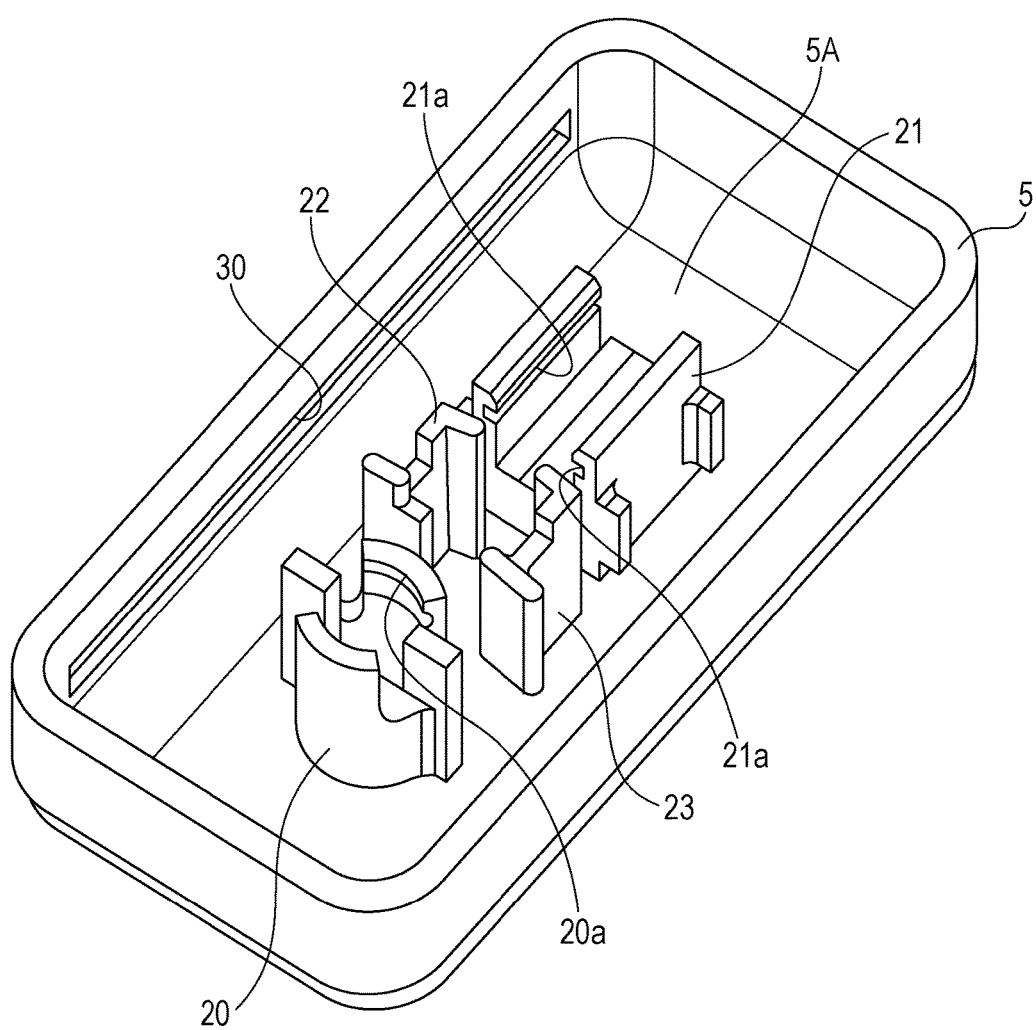
FIG. 5 is an enlarged perspective view showing the structure of the inside of an operation knob according to an embodiment of the disclosure.

FIG. 1 is a plan view of a seat switch according to an example embodiment of the present disclosure. FIG. 2 is a side view of the seat switch. FIG. 3 is an enlarged perspective view showing an attachment part of a switch portion for a backrest provided in a case main body of the seat switch. FIG. 4 is an enlarged perspective view showing parts of tips of operation shafts, and shows a state where the tips of the operation shafts project from an upper plate portion of the case main body. FIG. 5 is an enlarged perspective view showing the structure of the inside of an operation knob.

Seat Switch

As shown in FIGS. 1 and 2, a seat switch 1 may be attached to a side surface of a vehicle seat, and may include a seat portion switch 2 for adjusting the position/height of a seat portion and a backrest switch 3 for adjusting the posture of a backrest.

The seat portion switch 2 may be provided with a hollow seat portion operation knob 4 that makes up an input device, and the backrest switch 3 also may be provided with a hollow backrest operation knob 5 that makes up the input device.

For example, by operating the seat portion operation knob 4 in the direction of arrow A1 in FIG. 1, the forward movement of the seat portion can be adjusted. By operating the seat portion operation knob 4 in the direction of arrow A2 in FIG. 1, the backward movement of the seat portion can be adjusted.

By operating the backrest operation knob 5 in the direction of arrow B1 in FIG. 1, a headrest provided in the upper part of the backrest can be raised. By operating the backrest operation knob 5 in the direction of arrow B2 in FIG. 1, the headrest can be lowered.

By rotationally operating the backrest operation knob 5 in the direction of arrow C1 in FIG. 1, the angle of the backrest can be adjusted in the direction of lowering the backrest. By rotationally operating the backrest operation knob 5 in the direction of arrow C2 in FIG. 1, the angle of the backrest can be adjusted in the direction of raising the backrest.

In this example, the details of the backrest switch 3 will be described, and the description of the seat portion switch 2 will be omitted. In the following description, the backrest operation knob 5 will be abbreviated as operation knob 5.

Backrest Switch

As shown in FIGS. 2 and 3, the backrest switch 3 may include a horizontally long case main body 6, and a first switch portion 8 and a second switch portion 9 that may be mounted on a board 7 provided on the inner bottom of the case main body 6. The first switch portion 8 may be for adjusting the height of the headrest provided in the upper part of the backrest. The second switch portion 9 may be for adjusting the angle of the backrest.

A first operation shaft 10 that makes up the input device may be provided in the upper part of the first switch portion 8. The first operation shaft 10 may be integrally attached to the central part of a first base 12 that may be attached slidably along rail portions 11 that are provided in the upper part of the first switch portion 8. A stem portion (not shown) that is fitted in an attachment hole (not shown) that is formed in the central part of the back surface of the first base 12 may be disposed inside the first switch portion 8.

When the first operation shaft 10 is driven in the direction of arrow D1 or the direction of arrow D2 in FIG. 3, the first base 12 is slid along the rail portions 11 of the first switch portion 8 in the same direction as the first operation shaft 10. Then, the stem portion attached to the first base 12 is also slid in the same direction as the first operation shaft 10.

When the first operation shaft 10 is driven in the direction of arrow D1 in FIG. 3 and the stem portion is also driven in the same direction, a signal driving the headrest upward may be sent to a headrest driving portion (not shown). When the first operation shaft 10 is driven in the direction of arrow D2 in FIG. 3 and the stem portion is also driven in the same direction, a signal driving the headrest downward is sent to the headrest driving portion.

The direction of arrow D1 in FIG. 3 is the same as the direction of arrow B1 in FIG. 1, and the direction of arrow D2 in FIG. 3 is the same as the direction of arrow B2 in FIG. 1.

A second operation shaft 13 that makes up the input device may be provided in the upper part of the second switch portion 9. The second operation shaft 13 may be integrally attached to the central part of a second base 15 that may be attached slidably along rail portions 14 that are provided in the upper part of the second switch portion 9. A stem portion (not shown) that is fitted in an attachment hole (not shown) that is formed in the central part of the back surface of the second base 15 is disposed inside the second switch portion 9.

When the second operation shaft 13 is driven in the direction of arrow E1 or the direction of arrow E2 in FIG. 3, the second base 15 is slid along the rail portions 14 of the second switch portion 9 in the same direction as the second operation shaft 13. Then, the stem portion attached to the second base 15 is also slid in the same direction as the second operation shaft 13.

When the second operation shaft 13 is driven in the direction of arrow E1 in FIG. 3 and the stem portion is also driven in the same direction, a signal rotationally driving the backrest in the lowering direction is sent to a backrest driving portion (not shown). When the second operation shaft 13 is driven in the direction of arrow E2 in FIG. 3 and the stem portion is also driven in the same direction, a signal rotationally driving the backrest in the raising direction is sent to the backrest driving portion.

As shown in FIG. 4, the tip of the first operation shaft 10 may project from an upper plate portion 16 of the case main body 6 to the outside through a first elongate hole 17 that is a first shaft insertion hole formed through the upper plate portion 16 of the case main body 6. The longitudinal direction of the first elongate hole 17 is the direction in which the first operation shaft 10 is driven. The first operation shaft 10 may be movable within the first elongate hole 17 in the longitudinal direction thereof.

The tip of the second operation shaft 13 may project from the upper plate portion 16 of the case main body 6 to the outside through a second elongate hole 18 that is a second shaft insertion hole formed through the upper plate portion 16 of the case main body 6. The longitudinal direction of the second elongate hole 18 is the direction in which the second operation shaft 13 is driven. The second operation shaft 13 is movable within the second elongate hole 18 in the longitudinal direction thereof.

By virtue of such a configuration, the first operation shaft 10 and the second operation shaft 13 are movable along the upper plate portion 16 of the case main body 6.

A pillar portion 19 that limits the range of movement of the operation knob 5 is provided on the surface of the upper plate portion 16 of the case main body 6 so as to be located between the first elongate hole 17 and the second elongate hole 18.

The operation knob 5 for driving the operation shafts 10 and 13 may be movably attached to the tips of the first operation shaft 10 and the second operation shaft 13.

As shown in FIG. 5, the upper surface 5A of the inner wall of the operation knob 5 is provided with an annular first bearing portion 20 rotatably attached to the tip of the first operation shaft 10, and a rail-like second bearing portion 21 linearly movably attached to the tip of the second operation shaft 13.

Figure 6:
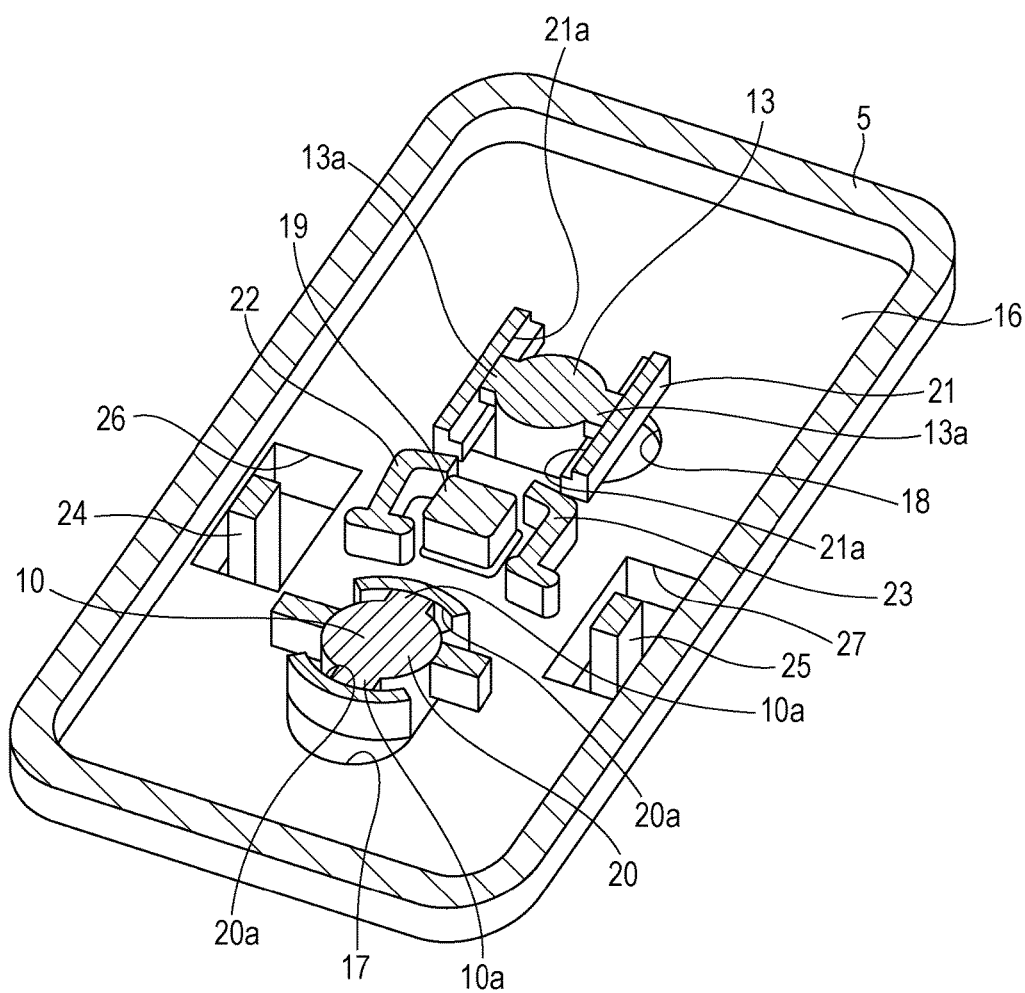
FIG. 6 is an enlarged horizontal sectional perspective view for illustrating the attachment state of the operation knob to operation shafts.
Figure 7:
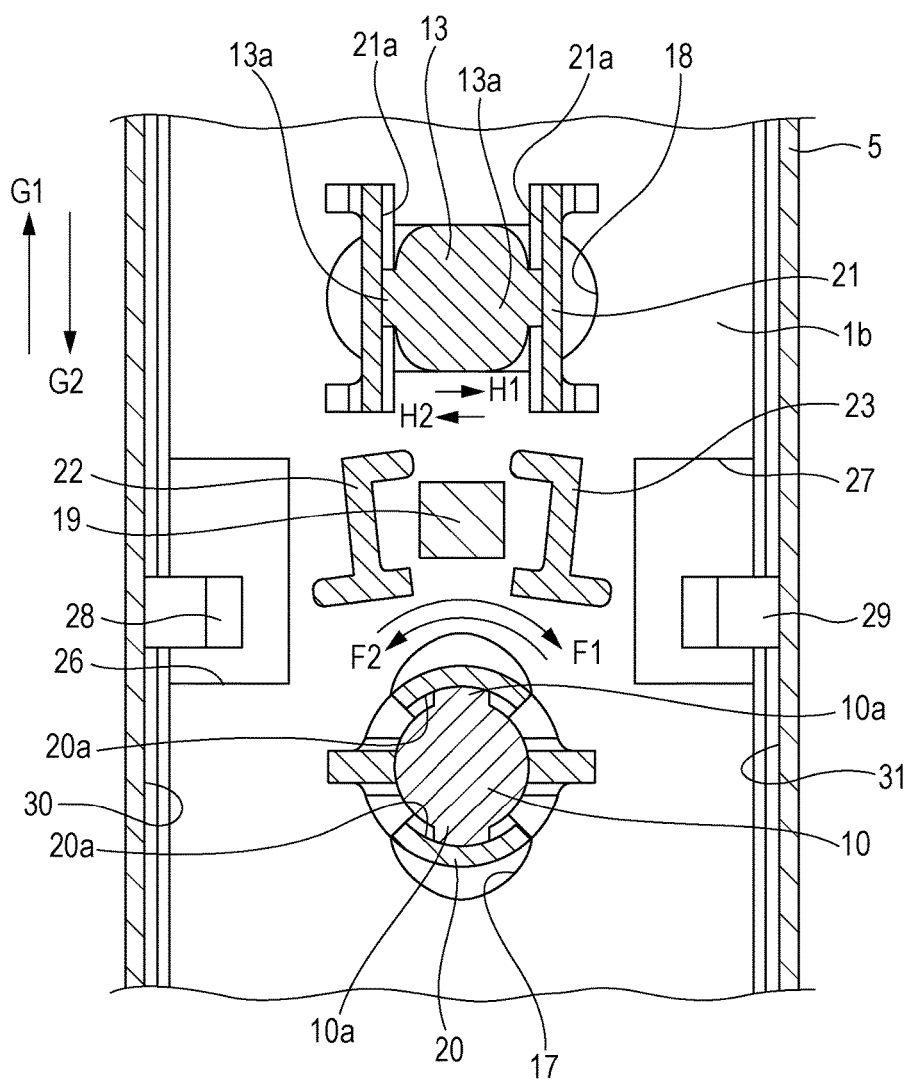
FIG. 7 is an enlarged horizontal sectional view showing a part where the operation knob is attached to the operation shafts.

As shown in FIGS. 6 and 7, the first bearing portion 20 may be fitted on the tip of the first operation shaft 10 so as to be rotatable in the direction of arrow F1 or F2 in FIG. 7. A pair of first projecting portions 10a may project from radially opposite positions on the outer peripheral surface of the tip of the first operation shaft 10. A pair of fan-shaped first fitting groove portions 20a may be formed at radially opposite positions on the inner peripheral surface of the first bearing portion 20. By fitting the first fitting groove portions 20a onto the first projecting portions 10a, the first bearing portion 20 is recess-projection fitted on the first operation shaft 10. The first fitting groove portions 20a may be loosely fitted on the first projecting portions 10a so that the operation knob 5 can be smoothly rotationally operated.

The direction of arrow F1 in FIG. 7 is the same as the direction of arrow C1 in FIG. 1, and the direction of arrow F2 in FIG. 7 is the same as the direction of arrow C2 in FIG. 1.

The second bearing portion 21 may be fitted on the tip of the second operation shaft 13. A pair of second projecting portions 13a may project from radially opposite positions on the outer peripheral surface of the tip of the second operation shaft 13. A pair of linear second fitting groove portions 21a may be formed in opposite surfaces of the second bearing portion 21. By fitting the second fitting groove portions 21a onto the second projecting portions 13a, the second bearing portion 21 is recess-projection fitted on the second operation shaft 13.

Since the second bearing portion 21 is fitted on the second operation shaft 13, the operation knob 5 is supported movably in the direction of arrow G1 or G2 in FIG. 7. The second fitting groove portions 21a may be loosely fitted on the second projecting portions 13a so that the operation knob 5 can be smoothly operated.

The direction of arrow G1 in FIG. 7 is the same as the direction of arrow B1 in FIG. 1. The direction of arrow G2 in FIG. 7 is the same as the direction of arrow B2 in FIG. 1.

Figure 8:
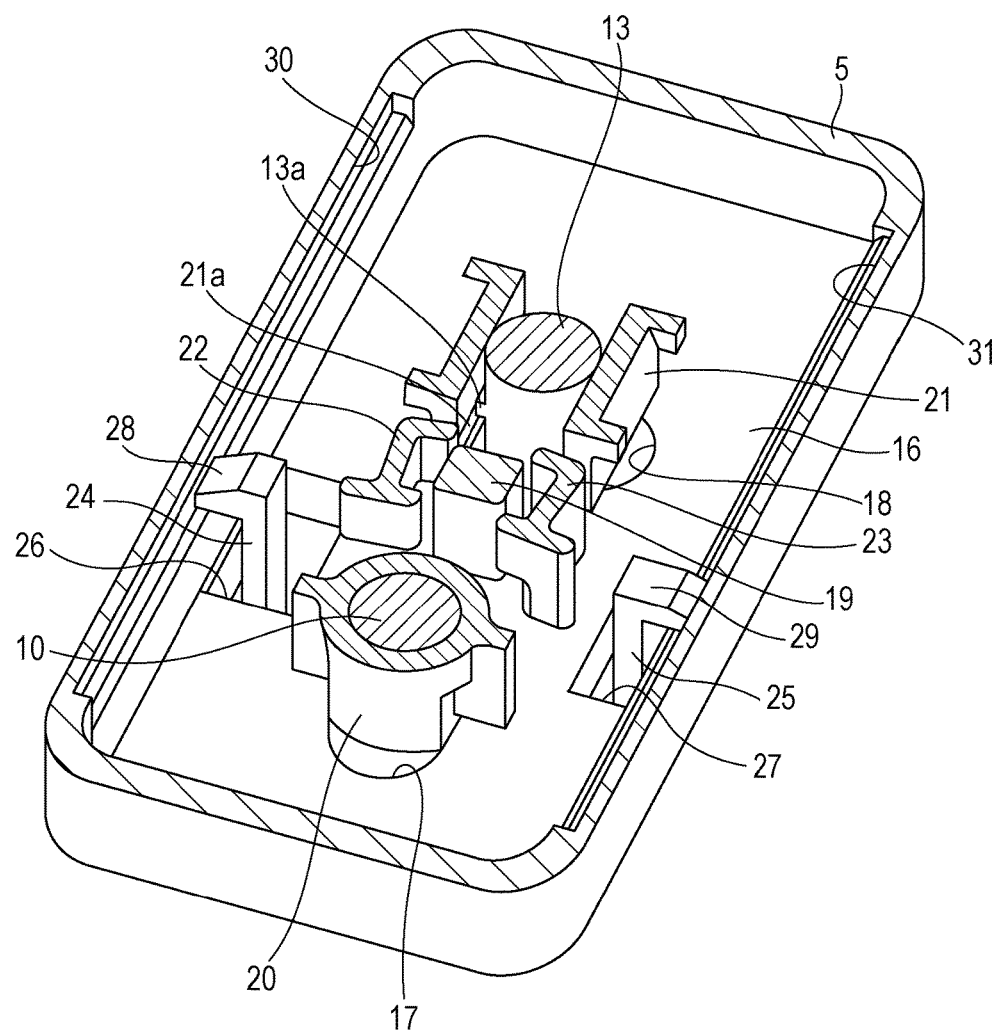
FIG. 8 is an enlarged horizontal sectional perspective view showing the engagement of elastic support pieces with the operation knob.

As shown in FIG. 8, a first frame portion 22 and a second frame portion 23 between which the pillar portion 19 for limiting the range of movement of the operation knob 5 is inserted may be oppositely provided on the upper surface 5A of the inner wall of the operation knob 5 so as to be located between the first bearing portion 20 and the second bearing portion 21.

A first elastic support piece 24 and a second elastic support piece 25 that deform following the movement of the operation knob 5 and elastically support the operation knob 5 are oppositely provided on the upper plate portion 16 of the case main body 6 so as to be located between the first operation shaft 10 and the second operation shaft 13. Since the case main body 6 is provided with the first and second elastic support piece 24 and 25, the operation knob 5 can be prevented from coming off from the operation shafts 10 and 13 when the operation knob 5 is operated.

A first piece insertion hole 26 into which the first elastic support piece 24 is inserted, and a second piece insertion hole 27 into which the second elastic support piece 25 is inserted may be formed through the upper plate portion 16 of the case main body 6 so as to be located between the first elongate hole 17 and the second elongate hole 18.

Figure 9:
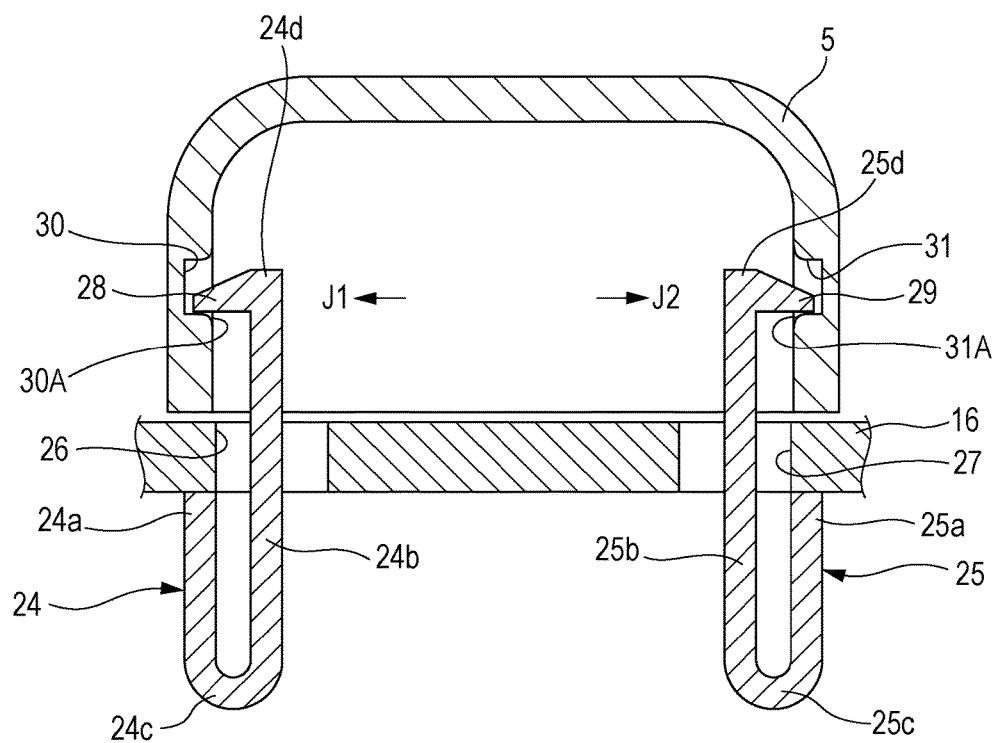
FIG. 9 is an enlarged vertical sectional view for illustrating the engagement of the elastic support pieces with the operation knob.

As shown in FIGS. 8 and 9, the first elastic support piece 24 may be configured such that a proximal end portion 24a is integrally attached to the underside of the upper plate portion 16 of the case main body 6, a main body portion 24b has a middle part 24c bent such that the main body portion 24b extends downward from the underside of the upper plate portion 16 of the case main body 6 and then extends upward toward the upper plate portion 16 of the case main body 6, and a distal end portion 24d projects to the outside through the first piece insertion hole 26 and enters the operation knob 5. A first hook portion 28 may be formed at the distal end portion 24d of the first elastic support piece 24.

The second elastic support piece 25 may be configured such that a proximal end portion 25a is integrally attached to the underside of the upper plate portion 16 of the case main body 6, a main body portion 25b has a middle part 25c bent such that the main body portion 25b extends downward from the underside of the upper plate portion 16 of the case main body 6 and then extends upward toward the upper plate portion 16 of the case main body 6, and a distal end portion 25d projects to the outside through the second piece insertion hole 27 and enters the operation knob 5. A second hook portion 29 may be formed at the distal end portion 25d of the second elastic support piece 25.

Since the elastic support pieces 24 and 25 have such a configuration, the length of the main body portions 24b and 25b can be formed long, and the elastic support pieces 24 and 25 have sufficient flexibility. Therefore, the amount of deflection of the elastic support pieces 24 and 25 can be large, and therefore the feel of operation of the operation knob 5 can be improved.

A first engaging groove portion 30 with which the first hook portion 28 of the first elastic support piece 24 is elastically engaged may be formed in the longitudinal direction of one side surface of the inner wall of the operation knob 5. A second engaging groove portion 31 with which the second hook portion 29 of the second elastic support piece 25 is elastically engaged may be formed in the other side surface of the inner wall of the operation knob 5 that is opposite to the one side surface of the inner wall of the operation knob 5.

Since the engaging groove portions 30 and 31 are elastically engaged with the hook portions 28 and 29, the operation knob 5 can be reliably prevented from coming off from the operation shafts 10 and 13.

As shown in FIG. 9, curved guide surfaces 30A and 31A are formed on the lower edges of the engaging groove portions 30 and 31. Therefore, although the engaging groove portions 30 and 31 are moved away from the hook portions 28 and 29 by operating the operation knob 5, when the operation knob 5 returns again to the original position, the engaging groove portions 30 and 31 are smoothly engaged with the hook portions 28 and 29.

Operation

The operation of the operation knob 5, the first operation shaft 10, the second operation shaft 13, the first elastic support piece 24, and the second elastic support piece 25 when adjusting the posture of the backrest will be described with reference to FIG. 7.

Adjustment of Height of Headrest

A case where the headrest provided in the upper part of the backrest is adjusted will be described.

When raising the headrest, the operation knob 5 is moved in the direction of arrow G1 in FIG. 7. Then, the second fitting groove portions 21a of the second bearing portion 21 of the operation knob 5 move along the second projecting portions 13a of the second operation shaft 13. By this movement of the operation knob 5, the first bearing portion 20 is also moved in the direction of arrow G1 in FIG. 7. By this movement of the first bearing portion 20, the first operation shaft 10 is driven along the first elongate hole 17 in the direction of arrow G1 in FIG. 7. By the driving of the first operation shaft 10, the stem portion of the first switch portion 8 integral with the first operation shaft 10 is also driven in the same direction as the first operation shaft 10 (the direction of arrow D1 in FIG. 3), and a signal driving the headrest upward is sent to the headrest driving portion.

The second fitting groove portions 21a of the second bearing portion 21 of the operation knob 5 may be fitted on the second projecting portions 13a of the second operation shaft 13, and the hook portions 28 and 29 may be engaged under biasing force with the engaging groove portions 30 and 31. Therefore, if, when the operation knob 5 is operated, a force is applied in a direction in which the fitting groove portions 21a of the second bearing portion 21 are disengaged from the second projecting portions 13a of the second operation shaft 13, the operation knob 5 can be prevented from coming off from the first operation shaft 10 or the second operation shaft 13 by the elastic support pieces 24 and 25.

In a case where the headrest is lowered, as with the above-described case where the headrest is raised, the operation knob 5 is moved.

That is, the operation knob 5 is moved in the direction of arrow G2 in FIG. 7. Then, the second fitting groove portions 21a of the second bearing portion 21 move along the second projecting portions 13a of the second operation shaft 13. By this movement of the operation knob 5, the first bearing portion 20 is also moved in the direction of arrow G2 in FIG. 7. By this movement of the first bearing portion 20, the first operation shaft 10 is driven along the first elongate hole 17 in the direction of arrow G2 in FIG. 7. By the driving of the first operation shaft 10, the stem portion of the first switch portion 8 integral with the first operation shaft 10 is also driven in the same direction as the first operation shaft 10 (the direction of arrow D2 in FIG. 3), and a signal driving the headrest downward is sent to the headrest driving portion.

The second fitting groove portions 21a of the second bearing portion 21 of the operation knob 5 may be fitted on the second projecting portions 13a of the second operation shaft 13, and the hook portions 28 and 29 may be engaged under biasing force with the engaging groove portions 30 and 31. Therefore, if, when the operation knob 5 is operated to lower the headrest, a force is applied in a direction in which the second fitting groove portions 21a of the second bearing portion 21 are disengaged from the second projecting portions 13a of the second operation shaft 13, the operation knob 5 can be prevented from coming off from the first operation shaft 10 or the second operation shaft 13 by the elastic support pieces 24 and 25.

Adjustment of Angle of Backrest

Next, a case where the angle of the backrest is adjusted will be described.

When adjusting the angle of the backrest in the direction of lowering the backrest, the operation knob 5 is rotated about the first operation shaft 10 in the direction of arrow F1 in FIG. 7 (the direction of arrow C1 in FIG. 1). By this rotational operation of the operation knob 5, the second bearing portion 21 is rotated about the first operation shaft 10 in the direction of arrow F1 in FIG. 7. By this rotation of the second bearing portion 21, the second operation shaft 13 is driven along the second elongate hole 18 in the direction of arrow H1 in FIG. 7.

By the driving of the second operation shaft 13, the stem portion of the second switch portion 9 integral with the second operation shaft 13 is also driven in the same direction as the second operation shaft 13 (the direction of arrow E1 in FIG. 3), and a signal rotationally driving the backrest in the lowering direction is sent to the backrest driving portion.

The first frame portion 22 comes into contact with the pillar portion 19, thereby limiting the amount of rotation of the operation knob 5 in the direction of lowering the backrest. Therefore, the operation knob 5 can be prevented from being rotated more than necessary.

When the operation knob 5 is rotated in the direction of arrow F1 in FIG. 7, the first hook portion 28 of the first elastic support piece 24 is pushed in the direction of arrow J1 in FIG. 9 against biasing force, and the first hook portion 28 continues to be engaged under biasing force with the first engaging groove portion 30 of the operation knob 5. Since the amount of deflection of the main body portion 24b of the first elastic support piece 24 is large, the first hook portion 28 can be pushed in while flexibly deforming the main body portion 24b of the first elastic support piece 24, the feel of operation of the operation knob 5 is neither strong nor weak, and just the right feel of operation can be obtained.

The second engaging groove portion 31 of the operation knob 5 moves away from the second hook portion 29 of the second elastic support piece 25, but is kept engaged with the second hook portion 29.

After the operation knob 5 is rotated in the direction of lowering the backrest, the operator releases their hand from the operation knob 5 and stops the rotational operation of the operation knob 5. Then, the operation knob 5 is rotated in the direction of arrow F2 in FIG. 7 by biasing force stored in the first hook portion 28 of the first elastic support piece 24, and the operation knob 5 automatically returns to the original position.

The second engaging groove portion 31 of the operation knob 5 moved away from the second hook portion 29 of the second elastic support piece 25 by rotationally operating the operation knob 5 is completely engaged with the second hook portion 29 of the second elastic support piece 25 again. Since the curved guide surface 31A is formed on the lower edge of the second engaging groove portion 31 of the operation knob 5, the second engaging groove portion 31 can be smoothly engaged with the second hook portion 29.

When adjusting the angle of the backrest in the direction of raising the backrest, the operation knob 5 is rotated about the first operation shaft 10 in the direction of arrow F2 in FIG. 7 (the direction of arrow C2 in FIG. 1). By this rotational operation of the operation knob 5, the second bearing portion 21 is also rotated in the direction of arrow F2 in FIG. 7. By this rotation of the second bearing portion 21, the second operation shaft 13 is driven along the second elongate hole 18 in the direction of arrow H2 in FIG. 7.

By the driving of the second operation shaft 13, the stem portion of the second switch portion 9 integral with the second operation shaft 13 is also driven in the same direction as the second operation shaft 13 (the direction of arrow E2 in FIG. 3), and a signal rotationally driving the backrest in the raising direction is sent to the backrest driving portion.

The second frame portion 23 comes into contact with the pillar portion 19, thereby limiting the amount of rotation of the operation knob 5 in the direction of lowering the backrest. Therefore, the operation knob 5 can be prevented from being rotated more than necessary.

When the operation knob 5 is rotated in the direction of arrow F2 in FIG. 7, the second hook portion 29 of the second elastic support piece 25 is pushed in the direction of arrow J2 in FIG. 9 against biasing force, and the second hook portion 29 continues to be engaged under biasing force with the second engaging groove portion 31 of the operation knob 5. Since the amount of deflection of the main body portion 25b of the second elastic support piece 25 is large, the second hook portion 29 can be pushed in while flexibly deforming the main body portion 25b of the second elastic support piece 25, the feel of operation of the operation knob 5 is neither strong nor weak, and just the right feel of operation can be obtained.

The first engaging groove portion 30 of the operation knob 5 moves away from the first hook portion 28 of the first elastic support piece 24, but is kept engaged with the first hook portion 28.

After the operation knob 5 is rotated in the direction of raising the backrest, the operator releases their hand from the operation knob 5 and stops the rotational operation of the operation knob 5. Then, the operation knob 5 is rotated in the direction of arrow F1 in FIG. 7 by biasing force stored in the second hook portion 29 of the second elastic support piece 25, and the operation knob 5 returns to the original position.

The first engaging groove portion 30 of the operation knob 5 moved away from the first hook portion 28 of the first elastic support piece 24 by rotationally operating the operation knob 5 is completely engaged with the first hook portion 28 of the first elastic support piece 24 again. Since the curved guide surface 30A is formed on the lower edge of the first engaging groove portion 30 of the operation knob 5, the first engaging groove portion 30 can be smoothly engaged with the first hook portion 28.

Since the elastic support pieces 24 and 25 are oppositely provided in the direction in which the operation knob 5 is operated, when the operation knob 5 is reciprocated, the elastic support pieces 24 and 25 can deform following the movement of the operation knob 5 and can elastically support the operation knob 5.

Since the elastic support pieces 24 and 25 are provided at positions where an operation load is applied to the operation knob 5, the operation knob 5 is stably supported by the elastic support pieces 24 and 25, and can be reliably prevented from coming off from the operation shafts 10 and 13.

As described above, in the seat switch 1 according to an example embodiment, the operation knob 5 is elastically supported on the case main body 6 by the elastic support pieces 24 and 25. Therefore, although the operation knob 5 is loosely fitted on the operation shafts 10 and 13 so that the operation knob 5 can be smoothly moved relative to the operation shafts 10 and 13, the operation knob 5 can be prevented from coming off from the operation shafts 10 and 13.

The elastic support pieces 24 and 25 may be configured such that proximal end portions 24a and 25a are integrally attached to the underside of the upper plate portion 16 of the case main body 6, main body portions 24b and 25b have middle parts 24c and 25c bent such that the main body portions 24b and 25b extend downward from the underside of the upper plate portion 16 of the case main body 6 and then extend upward toward the upper plate portion 16 of the case main body 6, and distal end portions 24d and 25d project to the outside through the first piece insertion hole 26 and the second piece insertion hole 27 and enter the operation knob 5. Therefore, the amount of deflection of the main body portions 24b and 25b of the elastic support pieces 24 and 25 can be large, and the elastic support pieces 24 and 25 have flexibility. Therefore, the operation knob 5 can be moved lightly, and the feel of operation of the operation knob 5 is good.

Since the elastic support pieces 24 and 25 may be configured to support the operation knob 5 inside the operation knob 5, and the elastic support pieces 24 and 25 are not exposed on the outside of the case main body 6, the elastic support pieces 24 and 25 do not affect the appearance.

The present invention is not limited to the above-described embodiment. That is, those skilled in the art may perform various modifications, combinations, subcombinations, and substitutions with respect to the components of the embodiments described above, within the technical scope of the present invention or its equivalent range.

In the above-described embodiment, an example has been described in which two operation shafts are driven by one operation knob. However, the present invention is also applied to an input device in which one operation shaft is driven by one operation knob, and the number of operation shafts driven by one operation knob is not limited.

In the above-described embodiment, an example has been described in which an operation knob is elastically supported by two elastic support pieces so that the elastic support pieces follow the movement of the operation knob operated in two different directions. However, in the present invention, if the operation knob is operated only in one direction, the operation knob may be elastically supported by one elastic support piece, and the number of elastic support pieces supporting operation knob is not limited.

The present invention is applicable to an input device in which an operation knob is attached to an operation shaft, and the operation shaft is driven by operating the operation knob.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
an operation shaft, a tip of the operation shaft being projected to the outside through a shaft insertion hole formed through a case main body, the operation shaft being movable along the case main body; and
an operation knob movably attached to the tip of the operation shaft and driving the operation shaft,
wherein a bearing portion provided inside the operation knob is recess-projection fitted on the operation shaft,
wherein the case main body is provided with an elastic support piece deforming following the movement of the operation knob and elastically supporting the operation knob, and
wherein the elastic support piece is provided such that a proximal end portion is integrally attached to the underside of the case main body, a main body portion has a middle part bent such that the main body portion extends downward from the underside of the case main body and then extends upward toward the underside of the case main body, and a distal end portion projects to the outside through a piece insertion hole formed through the case main body and enters the operation knob.

2. The input device according to claim 1, wherein a hook portion is formed at the tip of the elastic support piece, an engaging groove portion engaged with the hook portion is formed in the inner wall of the operation knob, the engaging groove portion is engaged with the hook portion, and the operation knob is thereby elastically supported by the elastic support piece.

3. The input device according to claim 1, wherein when the operation knob is operated, biasing force acts on the elastic support piece in a direction opposite to the operation direction.

4. The input device according to claim 1, wherein the elastic support piece comprises a first elastic support piece and a second elastic support piece provided opposite to each other in the case main body.

5. The input device according to claim 1, wherein the operation shaft comprises a first operation shaft and a second operation shaft, and the operation knob is supported rotatably about the first operation shaft and linearly movably along the second operation shaft.

6. The input device according to claim 5, wherein the elastic support piece is provided at a position between the first operation shaft and the second operation shaft in the case main body.

7. A vehicle seat having an input device according to claim 1 to adjust the posture of the vehicle seat.

* * * * *